US012576808B2

(12) United States Patent
Weston et al.

(10) Patent No.: US 12,576,808 B2
(45) Date of Patent: Mar. 17, 2026

(54) PORTABLE TOOLS FOR USE AS VEHICLE SECURITY DEVICES

(71) Applicant: FORD GLOBAL TECHNOLOGIES, LLC, Dearborn, MI (US)

(72) Inventors: Keith Weston, Canton, MI (US); John R. Van Wiemeersch, Novi, MI (US); Brendan F. Diamond, Naples, FL (US); Matthew J. Flis, Northville, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 18/751,728

(22) Filed: Jun. 24, 2024

(65) Prior Publication Data

US 2025/0388190 A1 Dec. 25, 2025

(51) Int. Cl.
*B60R 25/24* (2013.01)
*B60R 25/102* (2013.01)
*G07C 9/00* (2020.01)

(52) U.S. Cl.
CPC .......... *B60R 25/102* (2013.01); *B60R 25/241* (2013.01); *G07C 2009/00388* (2013.01); *G07C 2009/00507* (2013.01)

(58) Field of Classification Search
CPC ................ B60R 25/241; B60R 25/102; G07C 2009/00388; G07C 2009/00507
See application file for complete search history.

(56) References Cited

U.S. PATENT DOCUMENTS

| | | | |
|---|---|---|---|
| 9,948,359 B2 * | 4/2018 | Horton | H04B 5/20 |
| 10,421,435 B2 | 9/2019 | Pophale et al. | |
| 10,559,143 B1 | 2/2020 | Shen | |
| 11,097,689 B2 | 8/2021 | Golsch | |
| 11,440,107 B2 | 9/2022 | Robertson et al. | |
| 11,945,403 B2 | 4/2024 | Hanson et al. | |

(Continued)

FOREIGN PATENT DOCUMENTS

| | | | | |
|---|---|---|---|---|
| CN | 118250698 A * | 6/2024 | ......... | G07C 9/00563 |
| GB | 2487447 A | 7/2012 | | |
| WO | WO-2017207644 A1 * | 12/2017 | ............ | H04W 12/08 |

*Primary Examiner* — Yong Hang Jiang
(74) *Attorney, Agent, or Firm* — Frank Lollo; Brooks Kushman P.C.

(57) ABSTRACT

A vehicle security system controls access to vehicle functions when a user triggers vehicle access while carrying a first portable wireless token. Stored attributes for the first token are retrieved from a memory which stores respective attributes for a plurality of wireless tokens. At least one of the portable wireless tokens is integrated with a portable object having a non-vehicular function. When the retrieved attributes for the first token identify the wireless token integrated with the portable object, then a security controller checks for the presence of that selected token. When the selected token integrated with the portable object is not detected, then a message is transmitted to the user indicating that the portable object integrated with the non-detected token is not present in the vehicle. The stored attributes may include a limitation wherein the access request is granted only when the presence of the selected other token is detected.

17 Claims, 5 Drawing Sheets

50

| Token | Full Privileges | Limitations | Required Items | Warning Items |
|---|---|---|---|---|
| FOB #1 | Locks, Driving | None | None | RFID #1 |
| FOB #2 | Locks | Speed Restriction | RFID #2 To Drive | RFID #1 |
| RFID #1 | Locks, Driving | None | None | FOB #1 |
| RFID #3 | Locks | No Driving | RFID #4 To Power Electrical Outlets | None |
| Bluetooth Pairing #1 | Locks | None | RFID #1 To Drive | RFID #5 |
| ⋮ | | | | |

(56)     References Cited

U.S. PATENT DOCUMENTS

| 2008/0024270 A1* | 1/2008 | Katagiri | B60R 25/04 |
| | | | 340/5.72 |
| 2009/0243791 A1 | 10/2009 | Partin et al. | |
| 2016/0063777 A1 | 3/2016 | Wooley | |
| 2017/0352215 A1* | 12/2017 | Maiwand | G07C 9/00309 |
| 2019/0260590 A1* | 8/2019 | Kuenzi | H04W 4/80 |

* cited by examiner

| Token | Full Privileges | Limitations | Required Items | Warning Items |
|---|---|---|---|---|
| FOB #1 | Locks, Driving | None | None | RFID #1 |
| FOB #2 | Locks | Speed Restriction | RFID #2 To Drive | RFID #1 |
| RFID #1 | Locks, Driving | None | None | FOB #1 |
| RFID #3 | Locks | No Driving | RFID #4 To Power Electrical Outlets | None |
| Bluetooth Pairing #1 | Locks | None | RFID #1 To Drive | RFID #5 |
| ⋮ | | | | |

PORTABLE TOOLS FOR USE AS VEHICLE SECURITY DEVICES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to transportation/motor vehicle security systems, and, more specifically, to coordinated utilization of various types of wireless security devices for accessing a vehicle including tools or other apparatus carried by a user for non-vehicular purposes which can perform a dual purpose as a security key for unlocking vehicle doors or operating other driving functions.

Passive keyless entry is a type of vehicle security system wherein the user of a vehicle is able to unlock the vehicle doors and/or enabling a powertrain for driving (e.g., starting an engine) without manually inserting a key in a lock. Instead, the user carries a wireless transponder or transceiver (e.g., a fob) which carries security data that is automatically exchanged with the vehicle in order to authenticate the user. For a fully passive entry, touching a door handle is often used to initiate interrogation of the fob within a small region surrounding the door. Another type of security system is known as remote keyless entry (RKE) which uses an active key fob which transmits unlock and/or start codes (i.e., access signals) when a user presses a corresponding push button.

Portable wireless devices used as security keys or fobs can communicate wirelessly with an RF receiver in a vehicle using various RF modalities such as Bluetooth® Low Energy, Ultra Wide-Band (UWB), Wi-Fi, Ultra-High Frequency (UHF), Low Frequency (LF), Near Field Communication (NFC), and RFID. In addition to fobs or cards that are programmed into a vehicle security system during initial manufacture of the vehicle, supplementary security keys can be added by a purchaser/user of a vehicle. In one common example, mobile smartphones (i.e., cellphones) with an appropriate app can be used as a security key based on any of the RF services shared by the smartphone and the vehicle's transceivers. Supplemental key fobs have been available which aggregate with other objects, such as briefcases, jewelry, and mobile phone covers. Once programmed into a system, the prior art supplemental security keys have been able to operate on a standalone basis and have been provided with the same access rights as the original keys.

When using their vehicle for transport between particular locations, a user may be engaged with activities which involve transporting and using various portable objects, articles, or items (e.g., hand tools or portable power tools for performing tasks at a jobsite). For convenience, a user may utilize an add-on security key which mounts to or otherwise integrates with such a portable object, thereby eliminating the need to carry more than just the portable object (i.e., the original vehicle key fob does not have to be carried by the user). An add-on security key to integrate with a portable object can include a mountable RFID transponder unit or an RF enabled cover for an ID card, a police officer's badge, a smartphone, or other electronic components. Furthermore, an add-on key can utilize RF circuitry already present in a data processing device for other RF communication, such as a handheld scanner used by delivery drivers.

Although various kinds of articles have been utilized as a supplemental security key, there has been no coordination among the separate devices programmed into a particular vehicle.

SUMMARY OF THE INVENTION

In one aspect of the invention, a transportation vehicle is accessible via a plurality of portable wireless tokens configured to be carried by a user. At least one of the portable wireless tokens is integrated with a portable object having a non-vehicular function. Transportation vehicle comprises a wireless transceiver adapted to communicate with the portable wireless tokens. An actuator is configured to perform a vehicle function when the user triggers a request for a vehicle access while possessing one of the plurality of portable wireless token other than the portable wireless token integrated with the portable object having the non-vehicular function. A memory stores respective stored attributes for at least some of the plurality of portable wireless tokens, wherein at least some of the stored attributes identify an association to the one of the portable wireless tokens integrated with the portable object having the non-vehicular function. A controller is configured to (1) retrieve stored attributes for the portable wireless token carried by the user when the request is triggered, (2) check for the presence of the one of the portable wireless tokens integrated with the portable object when the retrieved attributes identify the one of the portable wireless tokens integrated with the portable object, and (3) when the one of the portable wireless tokens integrated with the portable object is not detected, then transmitting a message to the user indicating that the one of the portable wireless tokens integrated with the portable object is not present in the transportation vehicle.

In another aspect of the invention, a transportation vehicle is accessible via a plurality of portable wireless tokens configured to be carried by a user, wherein at least one of the portable wireless tokens is integrated with a portable object having a non-vehicular function. The transportation vehicle comprises a wireless transceiver adapted to communicate with the portable wireless tokens. An actuator is configured to perform a vehicle function when the user triggers a request for a vehicle access while possessing the one portable wireless token integrated with the portable object having the non-vehicular function. A memory stores respective attributes for at least some of the plurality of portable wireless tokens including the one portable wireless token integrated with the portable object, wherein the stored attributes for the one portable wireless token integrated with the portable object include a limitation regarding the vehicle access associated with the request in which the vehicle access is granted only when the wireless transceiver detects presence of another one of the portable wireless tokens. A controller is configured to (1) retrieve stored attributes for the one portable wireless token when the user triggers the request, (2) check for the presence of the another one of the portable wireless tokens, and (3) enable the vehicle access to the user when the another one of the portable wireless tokens is detected.

DETAILED DESCRIPTION OF PREFERRED EMBODIMENTS

Figure 1:
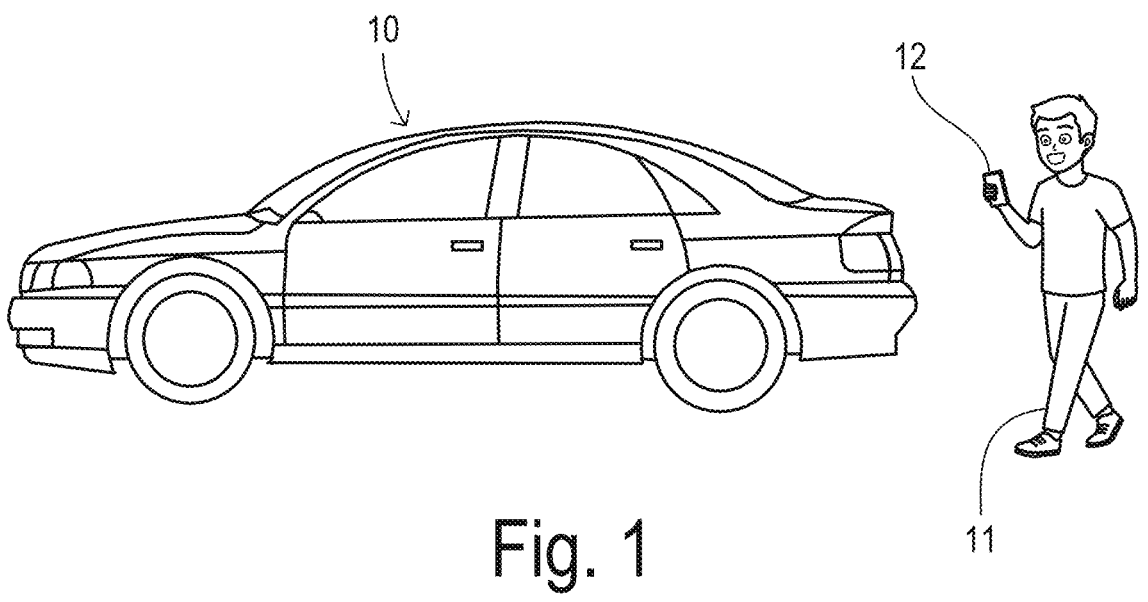
FIG. 1 is a schematic diagram showing a user approaching a vehicle having a wireless security feature.

In some embodiments, a plurality of supplemental security keys can be built upon devices having secure RF communication capability such as Bluetooth®, BLE, UWB, UHF/LF, and RFID (e.g., passive entry passive start functionality or PEPS) devices. Examples include scanners used by package delivery drivers, tool boxes, personal items, and individual tools used by workers on construction sites, whereby a user carrying the device can access their vehicle (e.g., unlocking the vehicle and starting the engine) without using a physical key or needing to carry another security key such as the original key fob that came with the vehicle. On the other hand, in some embodiments it may be desirable to condition a user's vehicle access based on carrying more than one of the plurality of security keys that have been programmed into a particular vehicle as another layer of security and/or to prevent driving of the vehicle without a desired combination of objects first being present.

As used herein, a portable wireless token refers to any such supplemental security key, including standalone key fob or security cards performing only the security functions as well as any portable objects (e.g., tools) having a non-vehicular function which is integrated with a wireless transmitter unit and configured to communicate with a vehicle security system. The portable wireless tokens can be configured to enable door locking/unlocking as operator exits/approaches vehicle, and to enable vehicle operation such as starting or shifting a transmission into a driving mode. For integrating with portable objects, wireless tokens can be comprised of attachments such as printed RFID tags or other transponders or miniature RF transmitters or transceivers. The wireless tokens can be formed as thin appliques with adhesive backing, for example. Some tokens may be built into a protective case for carrying the portable object, such as a case for a handheld scanner or a holder for an identification card or a police officer's badge.

A portable wireless token could also be obtained by integrating RF capability into standard size battery packages to be inserted into an object carried by a user (e.g., a flashlight, scanner, or tool). An RF unit could be added to carrying containers for other objects (such as a tool box or a purse) which the user does not want to leave behind when starting a trip in the vehicle. For a user who is a police officer, an RF unit could be integrated into their firearm, ammunition, ammunition case, vest, or badge.

In some embodiments, particular vehicle access settings can be tied to each respective portable wireless token. For example, access privileges or limitations can be assigned based on a monetary value of a tool. For example, a very expensive or very difficult to replace tool can be assigned a priority such that when the tool is transported to a remote location (e.g., jobsite) the vehicle is not allowed to subsequently leave the location without the important tool (or receiving a warning that the tool is absent). A user could configure security system operation such that the tools they need to remember are identified and the security system response to the presence of the tools is adapted accordingly. For example, when accessing a vehicle at a time known to correspond to a time when the user goes to a jobsite then limitations may be imposed on other tokens such that either a warning is generated or vehicle movement is impeded if the token for the priority tool is not detected in the vehicle.

In another example, expensive or hard to replace tools could be programmed as a security token but still protected against use for gaining access to the vehicle by unauthorized persons. In this case, when such a prioritized tool is in the vehicle then the driving of the vehicle may require a certain other one of the available wireless tokens to ensure that only the corresponding user can transport the tool. Conversely, if there are no priority items in the vehicle, then any tool or token could be used.

Referring to FIG. 1, a user 11 is shown approaching a vehicle 10 carrying a portable wireless token 12 which is recognizable by vehicle 10 using wireless communication to be an authorized security key for accessing vehicle 10. Access to vehicle 10 may include any selected functions of vehicle 10 such as door locking and unlocking, engine starting, activating an electric powertrain, engaging a transmission drive gear, activating electrical outlets or powerpoints, operating power windows, or any other controllable functions of vehicle 10. Portable wireless token 12 may be a standard (single-purpose) security key such as a remote entry key fob or NFC access card, or may be comprised of a wireless token integrated with a portable object having a non-vehicular function such as a handheld tool or other personal item (i.e., making it a dual-purpose security key).

Figure 2:
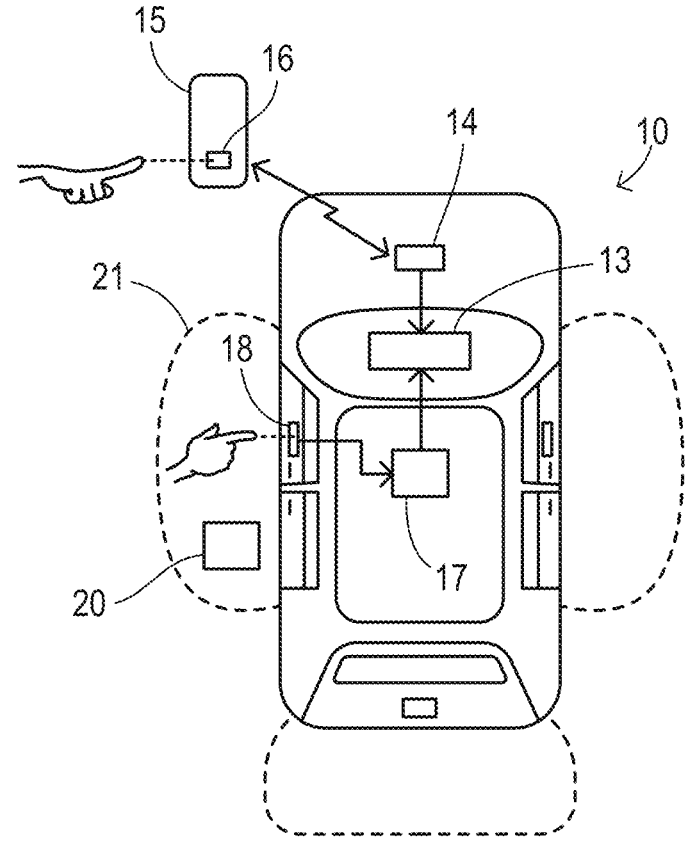
FIG. 2 is a schematic diagram of a vehicle system showing passive and active security keys.

The portable wireless tokens in the present invention may be actively or passively employed by the user. As shown in FIG. 2, vehicle 10 has a security controller 13 for controlling the vehicle access. An RF transceiver 14 connected to controller 13 may communicate with an active key-fob token 15 with a pushbutton 16 which is pressed by a user in order to transmit security codes for accessing corresponding functions. For using a passive wireless token 20, vehicle 10 has a short range passive-entry receiver 17 which may be activated when a user 18 touches a doorhandle 18 or other vehicle component, causing transceiver 17 to electromagnetically interrogate a region 21 around the doorhandle 18 in an attempt to detect the presence of token 20. In some embodiments, portable wireless tokens 15 and/or 20 can be integrated with a portable object having a non-vehicular function. Also in some embodiments, controller 13 may select privileges or limitations of a user's access based on detection of one or more portable wireless tokens which have been preconfigured with controller 13.

Figure 3:
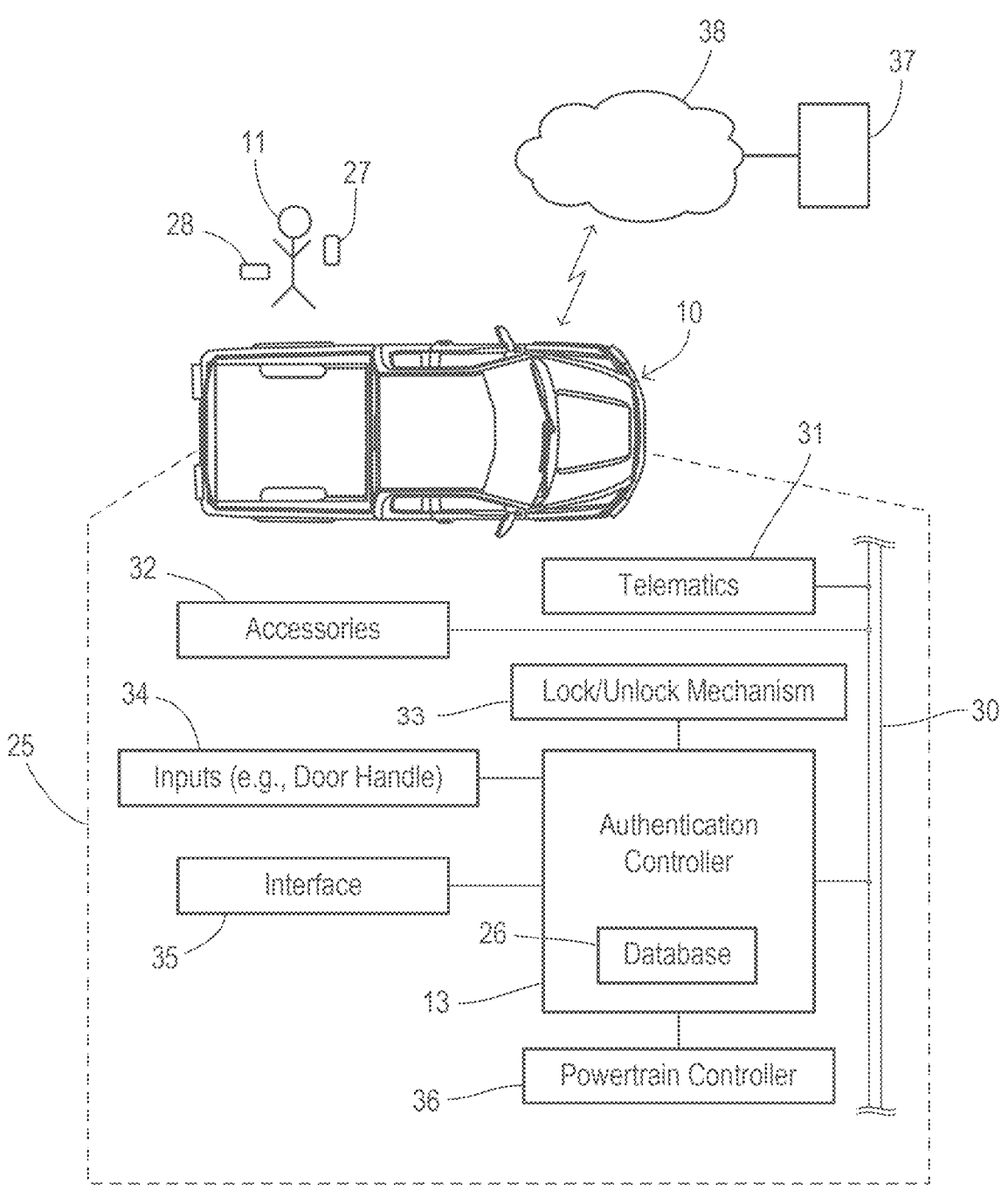
FIG. 3 is a schematic block diagram showing a vehicle with a security system in greater detail.

Referring to FIG. 3, vehicle 10 includes onboard systems 25 supporting a vehicle entry function which includes authenticating user 11 via one or more portable wireless tokens that user 11 may or may not be carrying. Controller 13 may include a database 26 which stores respective stored attributes for at least some of the plurality of portable wireless tokens, wherein at least some of the stored attributes identify an association to the one of the portable wireless tokens integrated with the portable object having the non-vehicular function. The stored attributes may define parameters which authenticate respective tokens and may include privileges and limitations to be granted or imposed on a user based on conditions such as the identities of all the wireless tokens that are present in or at the vehicle. Database 26 has been programmed to recognize a plurality of portable wireless tokens including (1) tokens 27 and 28 being carried by user 11, and (2) other tokens not in the vicinity of vehicle 10 when user 11 is approaching.

Some onboard systems 25 are interconnected by a communication bus 30, enabling authentication controller 13 to exchange data and commands with a telematics module 31 and other accessory modules 32. Authentication controller 13 is also coupled to a door lock/unlock mechanism 33, activation inputs 34 (e.g., door handle activation sensors), user interface 35 (e.g., touchscreen display panel, car horn, chirper, and/or exterior lights), and a powertrain controller 36.

Interface 35 may be operated by a user for configuring the attributes to be stored in database 26 for respective wireless tokens as they are programmed for vehicle access. Attributes can also be set up remotely (e.g., by a manager of a fleet of vehicles) using a remote interface 37 in communication with telematics module 31 via a wireless communication network 38.

Figures 4, 5:
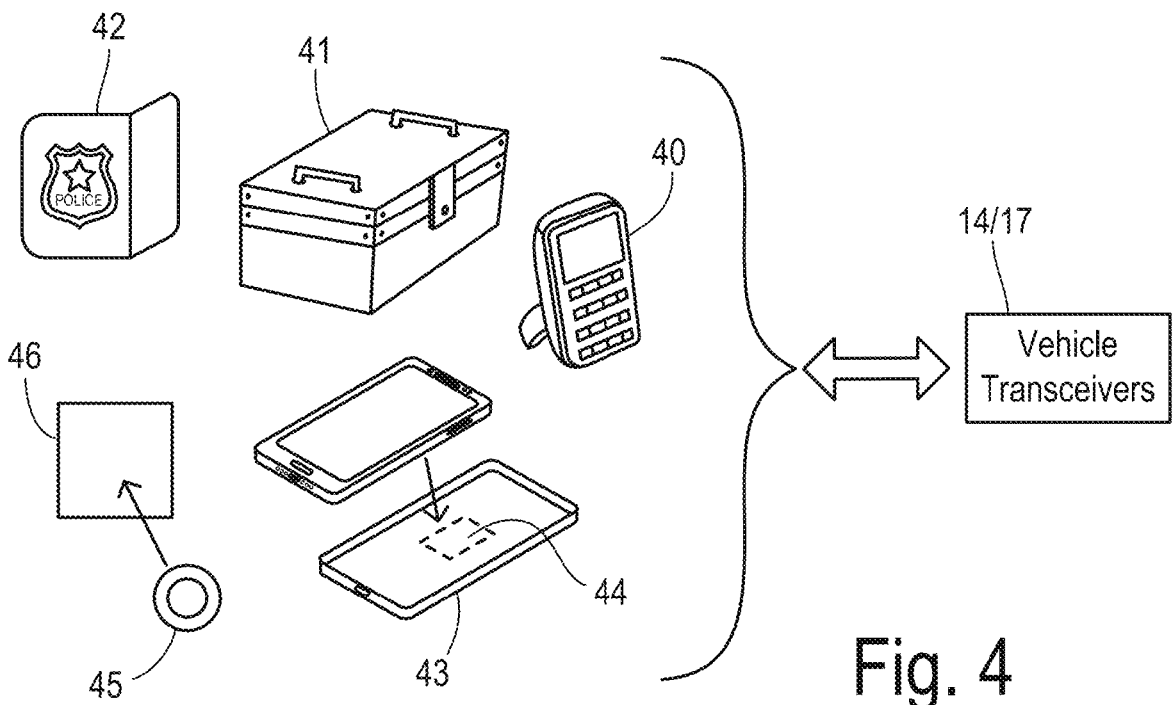
FIG. 4 is a schematic diagram showing a plurality of portable wireless tokens configured to interact with an RF transceiver of a vehicle security system.
FIG. 5 represents a database table for storing privileges and limitations for wireless tokens that have been configured into a security system.

FIG. 4 shows examples of portable objects having non-vehicular functions which may be integrated with a wireless token for communication with vehicle transceivers 14 and 17. For example, a handheld scanner 40 may be used by delivery drivers, wherein hand scanner 40 possesses wireless networking capabilities which can be utilized to enable hand scanner 40 to function as one of the portable wireless tokens programmed into a particular vehicle. Containers, such as a toolbox 41, can likewise be utilized as a portable wireless token by incorporating a wireless transponder, transmitter, or transceiver (not shown) in any convenient manner. A policeman's badge holder 42 can be likewise fitted with a wireless device and programmed as a portable wireless token. A cellphone case 43 has a wireless device 44 incorporated therein so that when the corresponding cellphone is carried by a user then case 43 may be recognized as one of the portable wireless tokens. More generally, an appliqué 45 containing a wireless transponder or transceiver can be applied to any desired portable object 46 which may be carried by a user and employed as a security key herein. Other examples of portable objects usable as portable wireless tokens include battery chargers, hand drills, saws, screwdrivers, wrenches, masks, eye protectors, and measuring devices such as laser levels.

Based on all the various security key tokens programmed into a particular vehicle security system, a database 50 shown in FIG. 5 is defined wherein access privileges or limitations may depend upon which particular portable wireless token is utilized in connection with an access request (e.g., the token carried by the user when the request is triggered by touching a doorhandle or other part of the vehicle). For each token, a plurality of stored attributes are specified by a user (e.g., an owner of the vehicle or a manager of a fleet of vehicles) to define the respective access to vehicle functions when the respective token is used (which may include defined usage scenarios in which certain conditions will apply). At least some of the stored attributes identify associations of a particular token to the concurrent detection of one of the portable wireless tokens integrated with the portable object having the non-vehicular function. The attributes define privileges and or limitations for at least some of the tokens which may depend upon the presence or absence of other tokens. Further, the attributes may specify required items (e.g., other tokens) which are required to be present and/or other tokens (identified in database 50) for which warning messages are to be generated and given to the user in the event that the other portable wireless tokens are not detected as being present. Database 50 is shown as a table. In a first entry, a security key identified as FOB#1 is granted full unlocking access and full driving privileges with no limitations. It is indicated that no required items are needed in order to utilize FOB#1 for the full driving and unlocking privileges. In a warning column, however, another portable wireless token designated RFID#1 is designated as requiring a warning message if it is not present when granting the full privileges to FOB#1. Accordingly, the user can set up an arrangement wherein whenever a trip is made invoking the use of a particular item (e.g., tool) integrated with the RFID#1 token, then a warning would be given so that the item is not left behind.

In another example, a token FOB#2 may be granted full locking and unlocking privileges. A driving limitation is identified wherein a speed restriction imposed. Furthermore, a token RFID#2 is identified as a required item in order to drive. In addition, a warning may be generated when the item integrated with RFID#1 is not present. The user may wish to set up the attributes associated with FOB#2 in this manner for various reasons. For example, a young driver may be provided with FOB#2 as their security key, thus enabling the young driver to operate only below certain speeds and only when they are carrying another selected object (RFID#2). For example, the object integrated with registered token RFID#2 may be comprised of a cellphone in order to ensure that a parent can communicate with the young driver.

In the stored attributes for token RFID#1, full privileges for locking unlocking and driving the vehicle are granted, with no required items and no limitations. However, a warning may be generated when accessing the vehicle using RFID#1 without FOB#1 being present. One purpose for this arrangement is when token RFID#1 is integrated with a particularly expensive or hard to replace tool, wherein the user wishes to grant full access based on carrying the tool but desires to obtain a reminder whenever the tool is being granted the access without one of the main original security key fobs being present.

In another example of attributes stored in database 50, a token designated RFID#3 has full lock and unlock privileges but has a limitation preventing any driving. The purpose of RFID#3 can be to enable use of the vehicle as an electrical power source but not as a transportation vehicle when a user possesses a tool with token RFID#3. A required item in this mode may include an additional registered token which is known to be employed by the user and which is compatible with the vehicle electrical system. For example, a tool with RFID#4 could be granted access to power from particular electrical outlets.

In another set of attributes, a Bluetooth Pairing #1 (e.g., a smartphone and app) may perform as a token with full locking/unlocking privileges and no limitations other than that token RFID#1 is required in order to be able to drive the vehicle. In addition, a warning may be generated whenever another token RFID#5 is not present.

Figure 6:
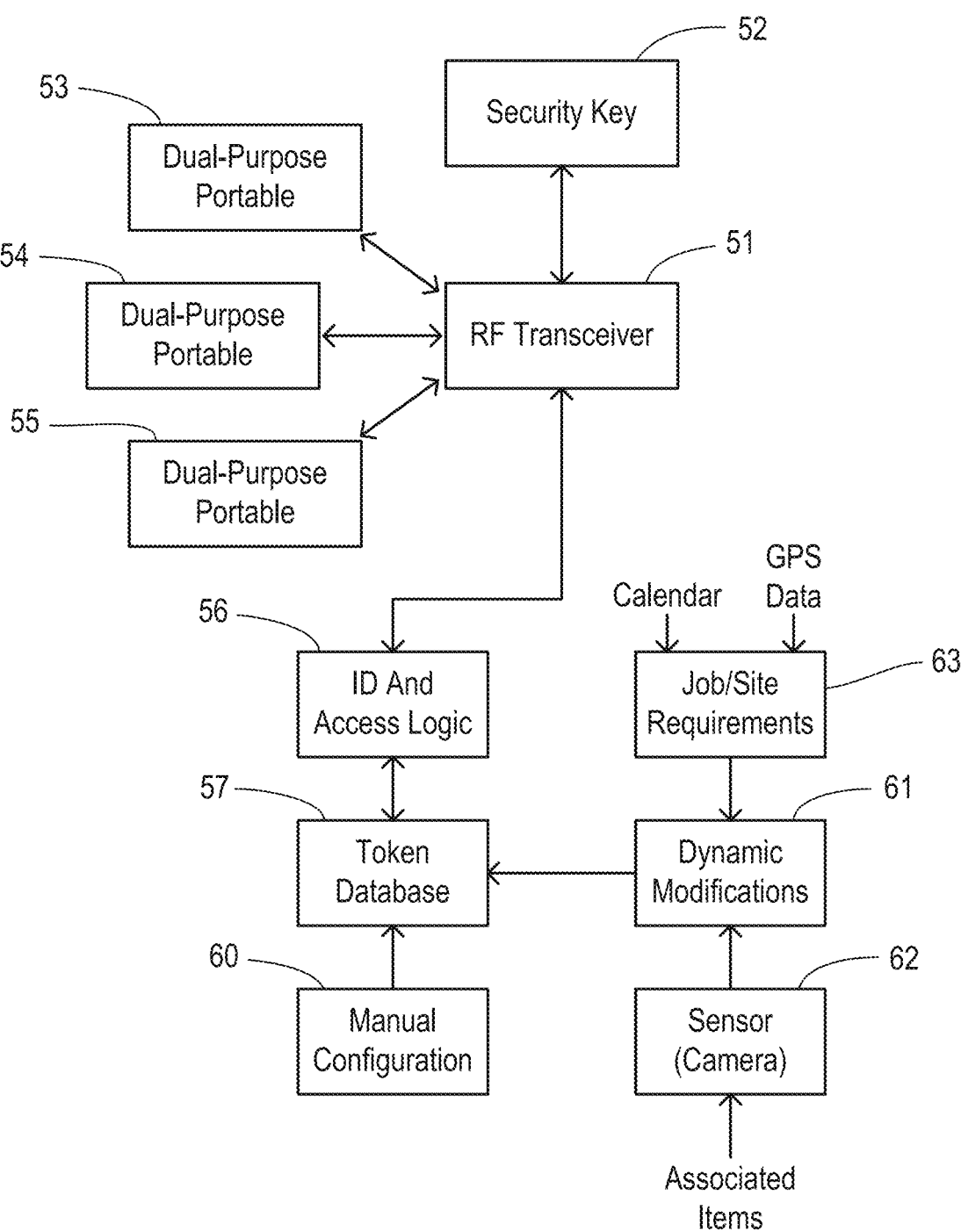
FIG. 6 is a block diagram showing components of an embodiment of the invention.

In some embodiments, attributes associated with certain tokens may be dynamically modified according to particular scenarios in which the user operates the vehicle. Usage scenarios may include trips to or from a jobsite, office, home, or other predetermined location. The detection of various scenarios may be obtained according to vehicle navigation data, entries on a user's electronically available calendar, time of day or date, the identity of the user accessing the vehicle, or other factors. FIG. 6 shows an embodiment in greater detail wherein associations between a portable wireless token used for requesting access and other tokens (which may or may not be detected to be present) are dynamically modified according to a detected usage scenario of the vehicle. An RF transceiver 51 may be in communication with one or more tokens, including a standalone (single purpose) security key 52 (e.g., security access card or key fob) or dual-purpose portable tokens 53-55. RF transceiver 51 is coupled to an ID and access logic block 56 (e.g., controller logic block) and provides token data based on the communication with the tokens. Logic block 56 retrieves information from a token database 57 in order to determine the corresponding attributes. Accordingly, logic block 56 grants various access to vehicle systems to the user. Token database 57 can be defined manually using a manual configuration block 60 wherein a user invokes a desired configuration via a human machine interface.

Some of the attributes may be conditional according to various elements of usage scenarios selected by the user. A scenario detector is configured to detect discriminators (i.e., variables) which are correlated to respective usage scenarios selected by the user. More specifically, conditions may be monitored using a dynamic modification logic block 61. The dynamic modifications may depend on usage scenarios which can be identified based on the presence of discriminators including various nearby landmarks, objects, persons, or environments. Some discriminators can be detected using sensors 62, such as a camera. Other discriminators for recognizing particular usage scenarios may include data from a vehicle or phone navigation system or from a user's electronic calendar. Thus, the dynamic modifications may be conditioned upon a determination that the vehicle is likely to drive to or from a job site or other location as determined by a logic block 63 coupled to receive GPS navigation data and/or calendar data. Based on a detected usage scenario, dynamic modifications 61 are used in accessing token database 57 to invoke corresponding changes in the associations in the stored attributes, wherein vehicle access may be conditioned upon the presence of a particular tool in some usage scenarios but not others.

Figure 7:
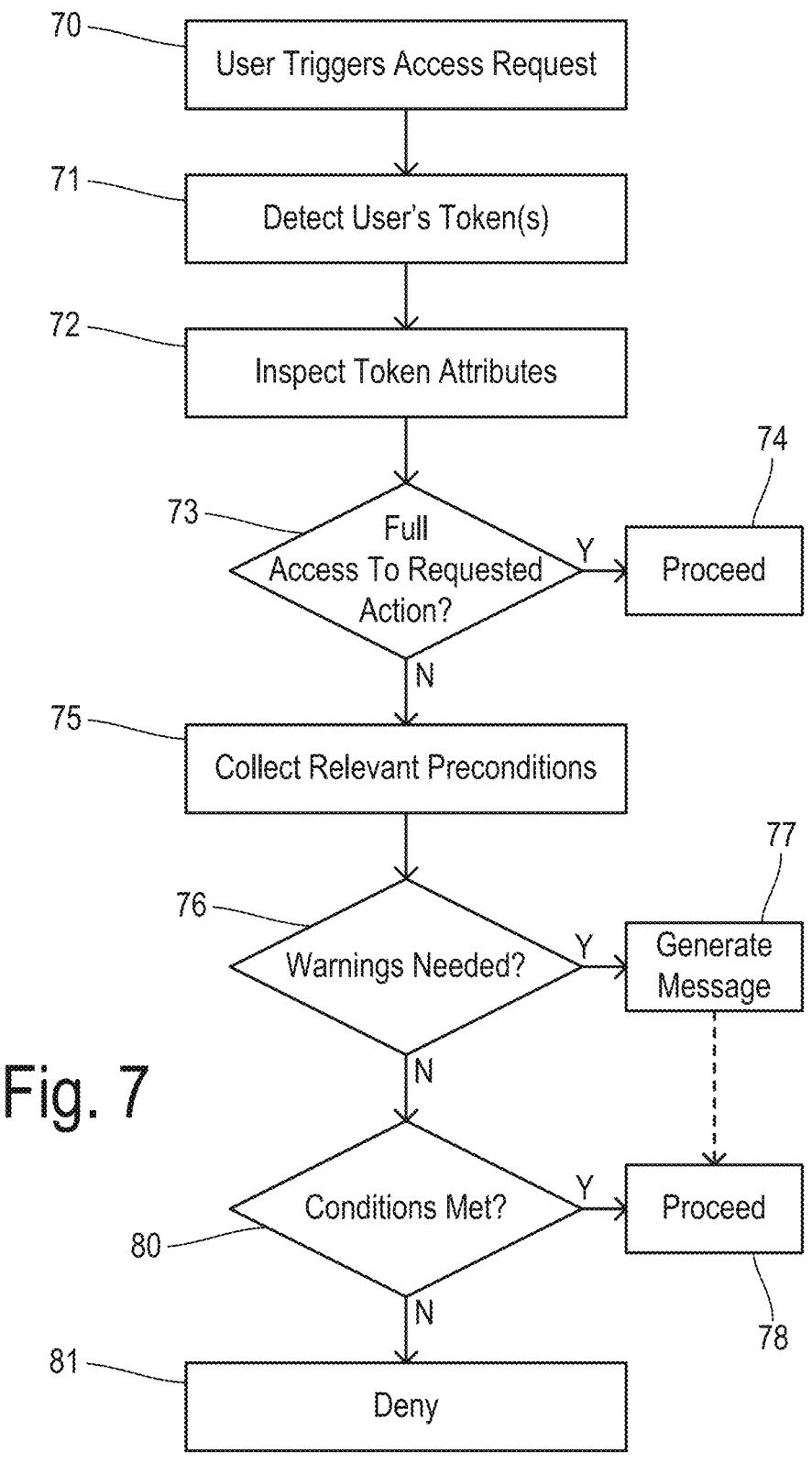
FIG. 7 is a flowchart showing one preferred method of the invention.

FIG. 7 shows a method of the present invention in greater detail. In step 70, the user triggers an access request while carrying at least one registered wireless token. The access request may be triggered by approaching the vehicle, touching a doorhandle or other part of the vehicle, or actively engaging a wireless token by pressing a button. The portable wireless tokens being carried by the user are detected in step 71. The token attributes are retrieved and inspected in step 72. A check is performed in step 73 to determine whether the retrieved token attributes provide full access to the requested action (e.g., whether the user should be permitted to unlock the door or actually drive the vehicle). If full access is available, then the user is allowed to proceed in step 74. If there is not full access, relevant associations or other conditions/limitations identified by the token attributes are collected in step 75. A check is performed in step 76 to determine whether a user warning is needed before proceeding with the requested action. If so, then the message is generated in step 77. In some embodiments, the user may be allowed to proceed in step 78 (e.g., when the attributes contain no other requirements). When there are other requirements, or when no warnings are needed, then a check is performed in step 80 to determine whether any identified conditions (e.g., presence of another particular token) have been met for the requested action. If so, then the user is allowed to proceed in step 78. Otherwise, access to the requested action is denied in step 81, and the user may be provided with a message explaining the reason to the denial.

What is claimed is:

1. A transportation vehicle accessible via a plurality of portable wireless tokens configured to be carried by a user, wherein at least one of the portable wireless tokens is integrated with a portable object having a non-vehicular function, the transportation vehicle comprising:

a wireless transceiver adapted to communicate with the portable wireless tokens;

an actuator configured to perform a vehicle function when the user triggers a request for a vehicle access while possessing one of the plurality of portable wireless tokens other than the portable wireless token integrated with the portable object having the non-vehicular function;

a memory storing respective stored attributes for at least some of the plurality of portable wireless tokens, wherein at least some of the stored attributes identify an association to the one of the portable wireless tokens integrated with the portable object having the non-vehicular function; and a controller configured to (1) retrieve stored attributes for the portable wireless token carried by the user when the request is triggered, (2) when the retrieved attributes identify the one of the portable wireless tokens integrated with the portable object, then checking for the presence of the one of the portable wireless tokens integrated with the portable object, and (3) when the one of the portable wireless tokens integrated with the portable object is not detected, then transmitting a message to the user indicating that the one of the portable wireless tokens integrated with the portable object is not present in the transportation vehicle.

2. The transportation vehicle of claim 1 wherein the stored attributes include a limitation regarding the vehicle access associated with the request in which the vehicle access is granted only when the wireless transceiver detects presence of the one of the portable wireless tokens integrated with the portable object.

3. The transportation vehicle of claim 2 wherein the vehicle function of the request is comprised of driving the transportation vehicle, and wherein the limitation regarding the vehicle access is comprised of preventing driving of the transportation vehicle by limiting access to the actuator.

4. The transportation vehicle of claim 1 further comprising:

a scenario detector configured to detect a discriminator correlated to respective usage scenarios of the transportation vehicle;

wherein the association in the stored attributes for the portable wireless token carried by the user to the one of the portable wireless tokens integrated with the portable object is dependent upon the respective usage scenarios, and wherein the controller dynamically modifies the association according to a detected one of the usage scenarios.

5. The transportation vehicle of claim 4 wherein the respective usage scenarios include a jobsite scenario, wherein the discriminator correlated to the jobsite scenario includes a geographic location or a time of day, and wherein the portable object having a non-vehicular function which is integrated with the one of the portable wireless tokens is comprised of an apparatus utilized by the user at the geographic location or time of day of the jobsite scenario.

6. A transportation vehicle accessible via a plurality of portable wireless tokens configured to be carried by a user, wherein at least one of the portable wireless tokens is integrated with a portable object having a non-vehicular function, the transportation vehicle comprising:

a wireless transceiver adapted to communicate with the portable wireless tokens;

an actuator configured to perform a vehicle function when the user triggers a request for a vehicle access while possessing the one portable wireless token integrated with the portable object having the non-vehicular function;

a memory storing respective stored attributes for at least some of the plurality of portable wireless tokens including the one portable wireless token integrated with the portable object, wherein the stored attributes for the one portable wireless token integrated with the portable object include a limitation regarding the vehicle access associated with the request in which the vehicle access is granted only when the wireless transceiver detects presence of another one of the portable wireless tokens; and a controller configured to (1) retrieve stored attributes for the one portable wireless token when the user triggers the request, (2) check for the presence of the another one of the portable wireless tokens, and (3) enable the vehicle access to the user when the another one of the portable wireless tokens is detected.

7. The transportation vehicle of claim 6 wherein the controller is further configured to disable the vehicle access to the user when the another one of the portable wireless tokens is not detected and transmitting a message to the user identifying the another one of the portable wireless tokens which is not being detected.

8. The transportation vehicle of claim 6 wherein the controller is further configured to transmit a message to the user identifying the another one of the portable wireless tokens which is not being detected.

9. The transportation vehicle of claim 6 wherein the vehicle function of the request is comprised of driving the transportation vehicle, and wherein the limitation regarding the vehicle access is comprised of preventing driving of the transportation vehicle by limiting access to the actuator.

10. The transportation vehicle of claim 6 further comprising:

a scenario detector configured to detect a discriminator correlated to respective usage scenarios of the transportation vehicle;

wherein the limitations in the stored attributes are dependent upon the respective usage scenarios, and wherein the controller dynamically selects the limitations according to a detected one of the usage scenarios.

11. The transportation vehicle of claim 10 wherein the respective usage scenarios include a jobsite scenario, wherein the discriminator correlated to the jobsite scenario includes a geographic location or a time of day, and wherein the portable object having a non-vehicular function which is integrated with the one of the portable wireless tokens is comprised of an apparatus utilized by the user at the geographic location or time of day of the jobsite scenario.

12. A method of controlling access to functions of a transportation vehicle, comprising the steps of:

a user triggering an access request by interacting with the transportation vehicle while carrying a first portable wireless token;

retrieving stored attributes for the first portable wireless token from a memory storing respective stored attributes for a plurality of portable wireless tokens, wherein at least one of the portable wireless tokens is integrated with a portable object having a non-vehicular function;

when the retrieved attributes for the first portable wireless token identify the one of the portable wireless tokens integrated with the portable object, then checking for the presence of the one of the portable wireless tokens integrated with the portable object using a wireless transceiver; and when the one of the portable wireless tokens integrated with the portable object is not detected, then transmitting a message to the user indicating that the one of the portable wireless tokens integrated with the portable object is not present in the transportation vehicle.

13. The method of claim 12 wherein the stored attributes include a limitation regarding the vehicle access associated with the request in which the vehicle access is granted only when the wireless transceiver detects presence of the one of the portable wireless tokens integrated with the portable object.

14. The method of claim 13 wherein the vehicle function of the request is comprised of driving the transportation vehicle, and wherein the limitation regarding the vehicle access is comprised of preventing driving of the transportation vehicle by limiting access to the actuator.

15. The method of claim 13 further comprising the steps of:

detecting a discriminator correlated to respective usage scenarios of the transportation vehicle; and dynamically modifying the limitations in the stored attributes dependent upon the detection of the respective usage scenarios.

16. The method of claim 15 wherein the respective usage scenarios include a jobsite scenario, wherein the discriminator correlated to the jobsite scenario includes a geographic location or a time of day, and wherein the portable object having a non-vehicular function which is integrated with the one of the portable wireless tokens is comprised of an apparatus utilized by the user at the geographic location or time of day of the jobsite scenario.

17. The method of claim 12 wherein the first portable wireless token is comprised of a portable wireless token integrated with a portable object having a non-vehicular function, and wherein another one of the portable wireless tokens is comprised of a security device which is not integrated with another portable object, the method further comprising the steps of:

disabling the vehicle access to the user when the another one of the portable wireless tokens is not detected; and transmitting a message to the user identifying the another one of the portable wireless tokens which is not being detected as the cause for the disabling.

* * * * *